Patented Mar. 1, 1932

1,847,358

UNITED STATES PATENT OFFICE

WILLIAM E. NEWNAM AND JEAN McCALLUM, OF COLLINSVILLE, ILLINOIS, ASSIGNORS TO NATIONAL LEAD COMPANY, OF NEW YORK, N. Y., A CORPORATION OF NEW JERSEY

WHITE LEAD PIGMENT AND PROCESS OF MAKING SAME

No Drawing.    Application filed November 14, 1927.  Serial No. 233,313.

It has long been known that the value of lead sulphate pigment depends on its degree of whiteness, the smallness of its particles and its hiding power; and heretofore numerous attempts have been made to produce lead sulphate pigment possessing these qualities in high degree. So far as we know, no practical process has heretofore been devised for manufacturing on a commercial scale a pigment consisting only of normal lead sulphate; and while divers processes produce a basic lead sulphate pigment, the commercial product is liable to be deficient in one or more of the qualities above mentioned, and its degree of basicity is subject to variation with variations in conditions existing during the manufacturing operations that are difficult to control.

One object of the present invention is to devise a process for manufacturing a lead sulphate pigment of high degree of whiteness, of fine particle size, and of substantial hiding power. Another object is to devise a process for producing a pigment consisting of normal lead sulphate substantially free from basicity. Another object is to devise a process for producing a lead sulphate pigment of substantially such degree of basicity as may be desired within wide limits.

The invention consists principally in making a pure lead matte from refined lead and elemental sulphur, with the sulphur content varying from a ten percent excess above the molecular quantity in natural galena, to a matte wherein the sulphur content is about thirty-three percent below the molecular quantity in natural galena. It also consists in controlling the sulphur content of the lead matte, within the limits mentioned, so that the proper sulphur dioxide concentration exists in the combustion chamber to produce a pigment of the desired basicity. It also consists in volatilizing the pure lead matte, or artificial galena, of controlled sulphur content, under conditions that permit of a very rapid and complete volatilization, while in suspension, of the fine matte particles, accompanied by a partial oxidation of said matte particles, wherein the heat of oxidation of the pulverized matte particles assists materially in volatilizing or fuming themselves, followed by complete oxidation, in a chamber containing sufficient excess oxygen and of correct temperature to accomplish this result. It also consists in a process for the manufacture of a basic lead sulphate of any degree of basicity or of a normal sulphate of lead. It also consists in the operations and combinations hereinafter set forth.

In carrying out our process, we start with refined lead and elemental sulphur free from impurities. The lead is finely pulverized and is thoroughly mixed with sulphur in the form of flowers of sulphur or other finely divided condition. For producing a normal lead sulphate pigment, the quantity of sulphur in the mixture is about ten percent in excess of that required theoretically for the formation of lead sulphide. This mixture of lead and sulphur is then burned or ignited at a temperature of 400 degrees Fahrenheit to 600 degrees Fahrenheit in a protected chamber, and the chemical action continues throughout the mass, forming a true lead matte, with crystals of lead sulphide intermingled with a ground mass of the remaining lead matte, and the whole mass free from anything that might adversely affect the color of the pigment to be made therefrom.

In making a matte for the production of a basic sulphate, the procedure is the same, except that the amount of sulphur is decreased and the resulting matte appears as a mass containing fine crystals of lead sulphide intermingled with a ground mass of matte containing fine particles of lead. When fully pulverized, each particle contains the elements in approximately the correct proportion to secure the desired results.

Any matte that is made under the above conditions is easily pulverized to whatever state of fine division is required.

With the matte, or artificial or synthetic lead sulphide pulverized to the correct degree of fineness, it is then blown, or dropped or mechanically sprayed into a suitable volatilization chamber, that is maintained at a temperature of about 2500 degrees Fahrenheit. Preferably such chamber is almost completely enclosed and is heated by combustion of a gaseous or liquid fuel burned inside of such chamber, and assisted by the partial combustion of the matte itself. The purpose of this more or less restricted volatilization chamber is to maintain a relatively high temperature therein in order to volatilize rapidly and completely the pulverized matte, so that the matte being in a vapor phase, its diffusion and oxidation in the combustion chamber will be more rapid and complete, and accomplished at a lower temperature than would otherwise be possible.

From the volatilization chamber the partially oxidized lead matte vapors pass into the combustion chamber, into which preheated or other air is admitted for the purpose of completing the oxidation of the partially oxidized lead matte vapor; but whereas the temperature of the volatilization chamber is maintained around 2500 degrees Fahrenheit for the purpose of rapidly volatilizing the lead matte, the temperature of the combustion chamber is maintained at around 1200 degrees Fahrenheit to 1400 degrees Fahrenheit so that the lead sulphate or basic lead sulphate will not be decomposed, or will not be overheated during the final oxidation. The amount of air admitted to the combustion chamber is definitely controlled by means of any suitable apparatus. From the combustion chamber, the product is passed to an ordinary bag house and collected.

As has been mentioned above, by reason of some excess oxygen above the requirements for burning the fuel in the volatilization chamber, some of the lead matter vapor is oxidized, and this reaction is desired up to a partial oxidation of the lead matte, in order that the heat of this oxidation may be utilized in the volatilization of the matte itself; and further, that the heat so liberated will not be transmitted to the combustion chamber, where a detrimental action will take place if the temperature is too high, by reason of breaking down the sulphates or overheating and injuring the fine particles of fume.

It is also necessary that the temperature of the combustion chamber be limited to about 1400 degrees Fahrenheit in order that the action of the sulphur dioxide liberated in the volatilization chamber may be sufficient to completely sulphate that portion of the lead matte vapor which may be over-oxidized in the volatilization chamber.

In practice, it is desirable that the volatilization chamber be somewhat smaller than the combustion chamber, in order to concentrate the heat more perfectly, and the connecting throat between the two chambers is relatively small and offers a restricted passage so that the high heat is not drawn into the combustion chamber, and it is also desirable that the combustion chamber be relatively larger than the volatilizing chamber in order that the gases and vapors issuing from the restricted throat of the volatilizing chamber may quickly cool, and it is also desirable that the size of the combustion chamber be ample so that the diffusion of the lead sulphide vapors, the excess air and the sulphur dioxide gas may be complete while maintained at the critical reacting temperature, in order that the fume may be fully oxidized to the proper degree desired when leaving the combustion chamber and being drawn to the bag house.

In a general way it may be said that the main purpose of the relatively smaller size of the volatilization chamber, compared to the combustion chamber, is in order that a high heat may be maintained to quickly and completely volatilize the lead matte particles to a vapor or fume, which in such state passes into the combustion chamber and, by reason of it being in the vapor phase, it almost instantly diffuses with the excess air and sulphur dioxide present and is almost as quickly converted into the particular sulphate desired, depending upon the sulphur dioxide concentration, air concentration, and temperature maintained. It may also be said in a general way that when operating to produce a normal lead sulphate, the sulphur dioxide present in the combustion chamber is of greater concentration than when operating to produce a basic lead sulphate, because it has been found that more sulphur is required in the raw lead matte to produce the normal than the basic sulphate. It may also be said that the temperature in the combustion chamber is maintained at a lower temperature when making the normal sulphate than when making the basic sulphate, since the normal sulphate is decomposed into the basic sulphate if the temperature is too high. In either case it is desirable that the fume when once formed as a normal or basic sulphate be quickly withdrawn and cooled to atmospheric temperature so that it is not overheated and its properties injured.

In practice it is found that with the fuel burner well adjusted the excess sulphur in the pure lead matte should be approximately ten percent in excess of the total sulphur desired in the final product. In the manufacture of the normal sulphate, no harm is done by using a greater excess of free sulphur, as the only effect of such excess is to increase the concentration of the sulphur dioxide in the combustion chamber, and this increased concentration does not affect adversely the normal lead sulphate fume.

In the manufacture of the basic lead sulphate the initial sulphur content of the lead matte is such that there is a deficiency of sulphur in the lead matte below the molecular requirements for a straight lead sulphide, and by this control, the sulphur in the resulting product is regulated to the desired degree. For this product also, the excess of sulphur in the matte to be used is regulated to about ten percent in excess of the total sulphur desired in the final product.

As may be readily seen from the foregoing, the basicity of the finished product is regulated exactly and constantly by the nature of the pure lead matte. Assuming the operating conditions as to air and temperature properly controlled, the basicity of the lead sulphate is a function of the initial sulphur in the pure lead matte. The sulphur control, the purity of the lead matte, the volatilization in suspension of the finely divided lead matte particles, and the final complete combustion of the partly oxidized lead matte vapor under conditions of correct air and sulphur dioxide concentration in the combustion chamber, the latter governed by the sulphur in the initial lead matte, are all factors that contribute to the practical value of the process.

It is noted that in the manufacture of our pure lead matte, the mixture of lead and sulphur produces a homogeneous mass which is easily pulverized and ground to a very fine particle, even though the matte may contain either excess sulphur or excess lead above the molecular requirements of lead sulphide, and this condition whereby we can pulverize to a fine state of division the matte, makes it possible to introduce the material, including both lead and sulphur, in the required amount for the finished product, in such a state of division that when subjected to the heat of the first chamber the particles of lead matte are volatilized practically instantly and the vapor so formed is in ideal condition for rapid diffusion with the air in the combustion chamber for rapid and complete oxidation and also for rapid cooling to prevent overheating and injury to the pigment particle formed. In no other process of which we have knowledge is the correct amount of sulphur and lead introduced into the furnace in a single particle containing the correct proportion of these components to make the finished product.

It is noted that the raw materials used in this process are free from anything that may contaminate the product, and that in the process itself nothing of an injurious nature is introduced, such as coal ash, coke ash, particles of carbon, ore particles, cadmium, copper and the like. Due to this freedom from impurities, the whole process may be adjusted to the conditions of producing a lead pigment, whereas in the ordinary methods in use, certain regulations must be introduced into the manufacture which are intended solely to minimize the effects of certain impurities. Due to this combination of factors, the product manufactured by our process has exceptional purity, the particle size is very small and hence the hiding power is exceptional, and the product does not vary from day to day but is very uniform.

It is also noted that by our process a normal lead sulphate may be made which is a fumed product, and that a normal sulphate is a more stable pigment than a basic sulphate, and that for an equal lead content the normal sulphate will go farther and will cost less.

The present process makes it possible to produce substantially pure normal lead sulphate or to produce a pigment of basic lead sulphate of any basicity desired, within the range of basic sulphates that can be made.

What we claim is:

1. The process of manufacturing lead sulphate pigment which consists in mixing finely divided refined lead and elemental sulphur, burning said mixture into a matte, pulverizing such matte, and burning the same into lead sulphate pigment without access of any contaminating matter thereto.

2. The proccess of manufacturing lead sulphate pigment which consists in mixing finely divided refined lead and elemental sulphur with the proportion of sulphur to lead about ten per cent in excess of the proportion of sulphur to lead in the product, burning said mixture into a matte, pulverizing said matte, and burning the pulverized material into lead sulphate pigment without access thereto of any contaminating matter.

3. The process of manufacturing lead sulphate pigment which consists in mixing finely divided refined lead and elemental sulphur, exposing said mixture to a temperature of from 400 degrees Fahrenheit to 600 degrees Fahrenheit in a closed chamber, pulverizing the resulting matte, and burning said matte into lead sulphate pigment.

4. The improvement in the process of manufacturing lead sulphate pigment which consists in forming refined lead and elemental sulphur into a lead sulphide matte, pulverizing said matte, volatilizing the pulverized material at a temperature of about 2500 degrees Fahrenheit, and immediately oxidizing the same at a temperature of about 1200 degrees Fahrenheit to about 1400 degrees Fahrenheit.

5. The improvement in the process of manufacturing normal lead sulphate pigment which consists in forming from refined lead and sulphur a matte of lead sulphide with an excess of free sulphur commingled therewith, pulverizing said matte, and volatilizing the pulverized material at a temperature of about 2500 degrees Fahrenheit and immediately oxidizing the same at a temperature around 1200 degrees Fahrenheit to 1400 degrees Fahrenheit.

6. The process of manufacturing lead sulphate pigment, which consists in burning refined lead and elemental sulphur to form a matte of lead sulphide commingled with metallic lead, pulverizing said matte, and volatilizing the pulverized material at a temperature of about 2500 degrees Fahrenheit and immediately oxidizing the same at a temperature around 1200 degrees Fahrenheit to about 1400 degrees Fahrenheit.

7. The improvement in the process of manufacturing lead sulphate pigment, which consists in burning refined lead and elemental sulphur to form a matte of lead sulphide with the sulphur about ten percent in excess of the sulphur desired in the finished product, pulverizing said matte and volatilizing the pulverized material at a temperature of about 2500 degrees Fahrenheit and then oxidizing the lead matte vapor at a temperature of around 1400 degrees Fahrenheit.

8. The process of manufacturing lead sulphate pigment, which consists in mixing finely pulverized refined lead and finely divided elemental sulphur, burning such mixture into a lead sulphide matte, pulverizing the matte, injecting the pulverized material into a chamber kept at a temperature of about 2500 degrees Fahrenheit to quickly and completely volatilize the same and then passing the partially oxidized lead matte vapor into a combustion chamber for complete oxidation at a temperature of from about 1200 degrees Fahrenheit to about 1400 degrees Fahrenheit.

9. The process of manufacturing lead sulphate pigment which consists in burning molten refined lead and melted elemental sulphur to form a pure lead matte, pulverizing the matte, injecting the pulverized material into a chamber kept at a temperature of about 2500 degrees Fahrenheit wherein the pulverized matte particles are volatilized, and also partially oxidized, and then passing the partially oxidized lead matte vapor into a combustion chamber for its complete oxidation at a temperature of from about 1200 degrees Fahrenheit to about 1400 degrees Fahrenheit.

10. The process of manufacturing lead sulphate pigment which consists in mixing finely divided refined lead and finely divided elemental sulphur with the sulphur about ten percent in excess of the sulphur desired in the finished pigment, burning the mixture into a lead matte, pulverizing the matte, injecting the pulverized matte into a heated chamber kept at a temperature of about 2500 degrees Fahrenheit to volatilize the same, and then passing the lead matte fume into a combustion chamber for its final and complete oxidation at a temperature of from about 1200 degrees Fahrenheit to about 1400 degrees Fahrenheit.

11. The process of manufacturing lead sulphate pigment which consists in igniting refined lead and elemental sulphur to form a matte, with sulphur about ten percent in excess of the sulphur desired in the finished pigment, pulverizing said matte, blowing the pulverized material with a jet of air mixed with fluid fuel into a closed vaporizing chamber maintained at a temperature of about 2500 degrees Fahrenheit to volatilize the same and then passing the partially oxidized lead matte vapor into a combustion chamber, with a supply of air sufficient to fully oxidize the same, and kept at a temperature of from 1200 degrees to 1400 degrees Fahrenheit, whereby the pure lead matte vapor is converted into lead sulphate particles of very fine size and exceptional whiteness.

12. The process of manufacturing lead sulphate pigment which consists in igniting refined lead and elemental sulphur to form a matte, containing sulphur in such amount not more than ten percent in excess of that required for formation of lead sulphide that the finished pigment is of the desired degree of basicity without further addition of sulphur in any form, finely pulverizing said matte and injecting the pulverized material into a closed vaporizing chamber, maintained at a temperature of about 2500 degrees Fahrenheit, and then passing the partially oxidized lead matte vapor into a combustion chamber with supply of air sufficient to fully oxidize the same, and kept at a temperature of from 1200 degrees Fahrenheit to 1400 degrees Fahrenheit, whereby the pure lead matte vapor is converted into lead sulphate of very fine particle size and of great whiteness.

Signed at Collinsville, Illinois, this 7 day of November 1927.

WILLIAM E. NEWNAM.
JEAN McCALLUM.